US012706960B2

(12) United States Patent
Hegarty et al.

(10) Patent No.: US 12,706,960 B2
(45) Date of Patent: Aug. 11, 2026

(54) IMS NODE, NETWORK NODE AND METHODS FOR HANDLING COMMUNICATION IN A WIRELESS COMMUNICATION NETWORK

(71) Applicant: Telefonaktiebolaget LM Ericsson (publ), Stockholm (SE)

(72) Inventors: Charles Hegarty, Stockholm (SE); Andreas Anulf, Lidingö (SE); Magnus Bergstrand, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 438 days.

(21) Appl. No.: 18/039,476

(22) PCT Filed: Dec. 2, 2020

(86) PCT No.: PCT/SE2020/051157
§ 371 (c)(1),
(2) Date: May 30, 2023

(87) PCT Pub. No.: WO2022/119484
PCT Pub. Date: Jun. 9, 2022

(65) Prior Publication Data
US 2024/0039964 A1 Feb. 1, 2024

(51) Int. Cl.
*H04L 65/1016* (2022.01)
*H04W 76/10* (2018.01)

(52) U.S. Cl.
CPC ......... *H04L 65/1016* (2013.01); *H04W 76/10* (2018.02)

(58) Field of Classification Search
CPC ..... H04L 65/1016; H04L 67/51; H04L 67/02; H04W 76/10
See application file for complete search history.

(56) References Cited

U.S. PATENT DOCUMENTS

2010/0041398 A1 2/2010 Sand et al.
2011/0265153 A1* 10/2011 Guccione ................ H04L 63/08 726/5
2013/0067057 A1* 3/2013 Falkena .............. H04L 65/1063 709/223

FOREIGN PATENT DOCUMENTS

CN 115136563 A * 9/2022 ........... H04L 67/303
EP 2 456 182 A1 5/2012
(Continued)

OTHER PUBLICATIONS

OMA (Open Mobile Alliance) "RESTful Network API for Call Notification", Draft Version 1.0—Nov. 16, 2015 1 OMA-TS-REST_NetAPI_CallNotification-V1_0-20151116-D, XP 64187253A (160 pages).
(Continued)

*Primary Examiner* — Cheikh T Ndiaye
(74) *Attorney, Agent, or Firm* — Rothwell, Figg, Ernst & Manbeck, P.C.

(57) ABSTRACT

A method performed by an IP Multimedia Subsystem, IMS, node for handling communication in a wireless communication network is provided. The IMS node (12) transmits to a network node (13), data indicating a notification of a direction for a communication and information related to an additional service for the communication; and receives, from the network node, an indication of an action related to the communication and/or data related to the additional service.

18 Claims, 12 Drawing Sheets

(56) References Cited

FOREIGN PATENT DOCUMENTS

| | | | | |
|---|---|---|---|---|
| EP | 2117217 | B1 * | 3/2020 | ............ H04M 3/537 |
| WO | 2010/063199 | A1 | 6/2010 | |
| WO | WO-2011128003 | A1 * | 10/2011 | ......... H04L 65/1016 |

OTHER PUBLICATIONS

International Search Report and Written Opinion issued in International Application No. PCT/SE2020/051157 dated Aug. 27, 2021 (11 pages).

ETSI TS 129 199-3 V8.2.0 (Oct. 2009) (39 pages).

* cited by examiner

| Type: CallNotification | | | |
|---|---|---|---|
| **Element** | **Type** | **Optional** | **Description** |
| CallingParticipant | xsd:anyURI | No | Address (e.g. 'sip' URI, 'tel' URI, 'acr' URI) of the caller |
| CallingParticipantName | xsd:string | Yes | Name of the caller |
| CalledParticipant | xsd:anyURI | No | Address (e.g. 'sip' URI, 'tel' URI, 'acr' URI) of the called participant. |

Fig. 1a

| Type: Action | | | |
|---|---|---|---|
| **Element** | **Type** | **Optional** | **Description** |
| ActionToPerform | ActionValues | No | Indicates the action (Endcall, Continue, Route, Deferred) |
| RoutingAddress | xsd:anyURI | Yes | The address (e.g. 'sip' URI, 'tel' URI, 'acr' URI) to be used in case the action indicates 'Route'. |

Fig. 1b

| Type: CallNotification | | | |
|---|---|---|---|
| **Element** | **Type** | **Optional** | **Description** |
| CallingParticipant | xsd:anyURI | No | Address (e.g. 'sip' URI, 'tel' URI, 'acr' URI) of the caller |
| CallingParticipantName | xsd:string | Yes | Name of the caller |
| CalledParticipant | xsd:anyURI | No | Address (e.g. 'sip' URI, 'tel' URI, 'acr' URI) of the called participant. |
| : | : | : | : |
| Additional-net-info | Additional-net-info-Types [0..unbounded] | Yes | Additional network information (e.g. SIP headers, SIP values etc) |

Fig. 7a

| Enumeration: Additional-net-info-types | |
|---|---|
| **Enumerated value** | **Description** |
| Sip-Info | List of SIP headers & contents indicated in SIPInfoParameter |
| Info 1 [value] | Info element 1: Value can be pre-defined (e.g. 1x1=timestamp of invite) |
| Info 2 [value] | Info element 2: Value can be pre-defined |
| Info 3 [Value] | Info element 2: Value can be pre-defined |

Fig. 7b

| Element: SIPInfoParameter | |
|---|---|
| **Element name** | **Description** |
| Header | SIP header |
| Value | SIP header value |

Fig. 7c

| Type: Action | | | |
|---|---|---|---|
| **Element** | **Type** | **Optional** | **Description** |
| ActionToPerform | ActionValues | No | Indicates the action, Endcall, Continue etc… |
| RoutingAddress | xsd:anyURI | Yes | The address (e.g. 'sip' URI, 'tel' URI, 'acr' URI) to be used in case the action indicates 'Route'. |
| : | : | : | : |
| Announcement-info | Announcement-info-Types [0..unbounded] | Yes | Information on announcement to be played. |

Fig. 8a

| Enumeration: Announcement-info-type | | |
|---|---|---|
| **Enumerated value** | **Optional** | **Description** |
| Announcement-type | No | Local, External, Audiocall |
| Announcement-address | Yes | The address (e.g. URI) to be used in case announcement-type indicates “external”. |
| Announcement-code | Yes | Code used to media resource |

Fig. 8b

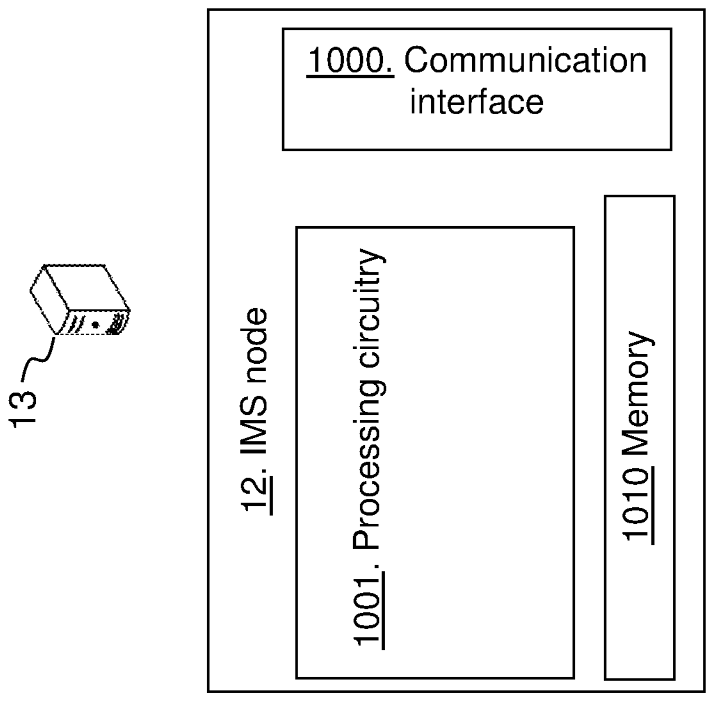
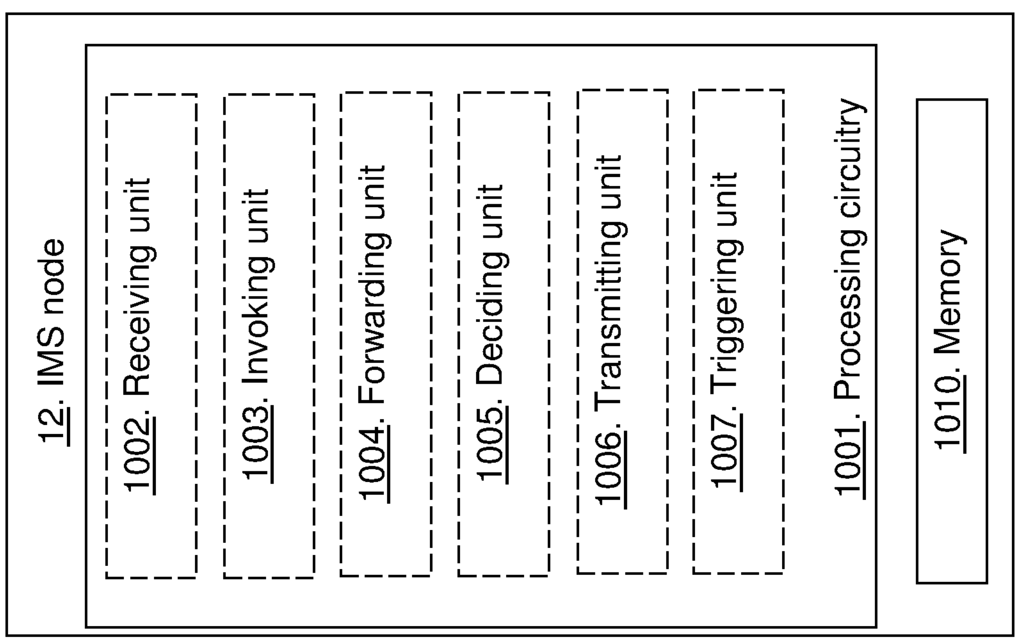
1009
1008
FIG. 10

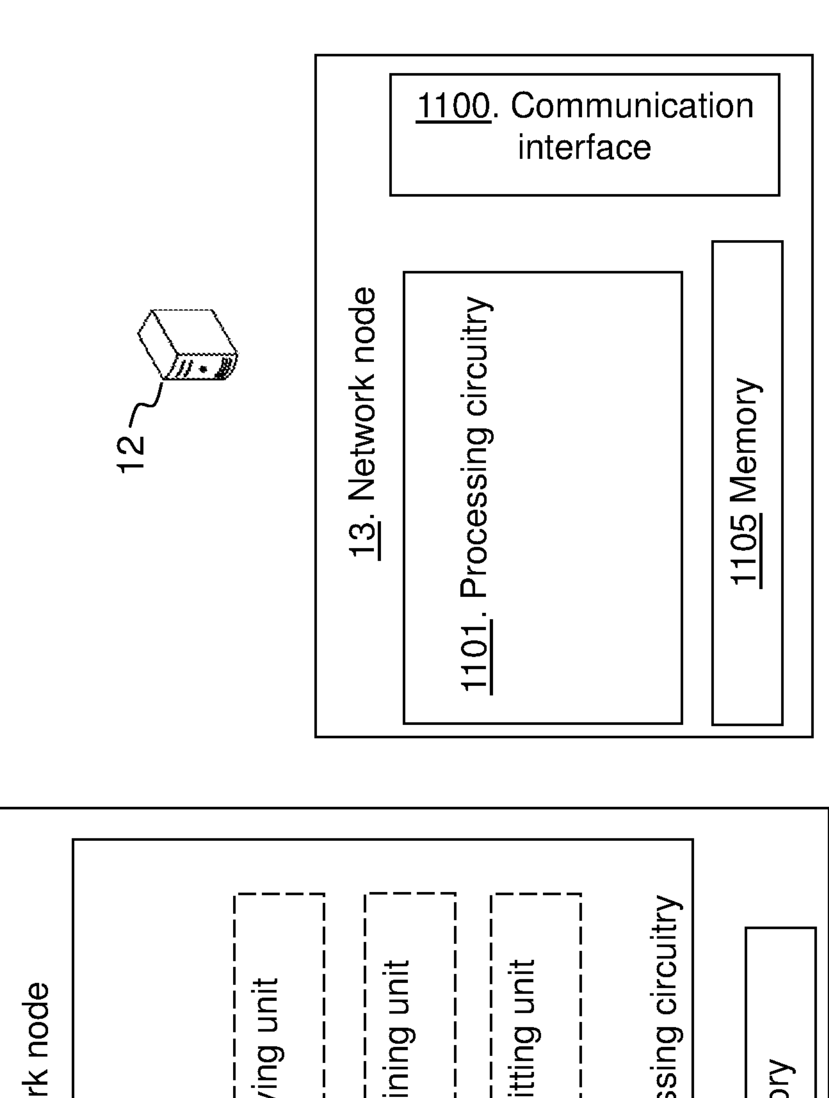
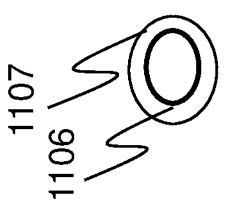
FIG. 11

IMS NODE, NETWORK NODE AND METHODS FOR HANDLING COMMUNICATION IN A WIRELESS COMMUNICATION NETWORK

CROSS REFERENCE TO RELATED APPLICATIONS

This application is a 35 U.S.C. § 371 National Stage of International Patent Application No. PCT/SE2020/051157, filed 2020 Dec. 2.

TECHNICAL FIELD

Embodiments herein relate to an Internet Protocol Multimedia Subsystem (IMS) node, a network node and methods performed therein. Furthermore, a computer program product and a computer-readable storage medium are also provided herein. In particular, embodiments herein relate to for handling communication in a wireless communication network.

BACKGROUND

In a typical wireless communication network, user equipment (UE), also known as wireless communication devices, mobile stations, stations (STA) and/or wireless devices, communicate via a Radio Access Network (RAN) to one or more core networks belonging to different network operators. The RAN covers a geographical area which is divided into areas or cell areas, with each area or cell area being served by a radio network node, e.g., a Wi-Fi access point or a Radio Base Station (RBS), which in some networks may also be called, for example, a NodeB, eNodeB or a gNodeB. The area or cell area is a geographical area where radio coverage is provided by the radio network node. The radio network node communicates over an air interface operating on radio frequencies with the UE within range of the radio network node.

A Universal Mobile Telecommunications System (UMTS) is a third generation telecommunication network, which evolved from the second generation (2G) Global System for Mobile Communications (GSM). The UMTS Terrestrial Radio Access Network (UTRAN) is essentially a RAN using Wideband Code Division Multiple Access (WCDMA) and/or High Speed Packet Access (HSPA) for user equipment. In a forum known as the Third Generation Partnership Project (3GPP), telecommunications suppliers propose and agree upon standards for third generation networks and UTRAN specifically, and investigate enhanced data rate and radio capacity. In some RANs, e.g. as in UMTS, several radio network nodes may be connected, e.g., by landlines or microwave, to a controller node, such as a Radio Network Controller (RNC) or a Base Station Controller (BSC), which supervises and coordinates various activities of the plural radio network nodes connected thereto. The RNCs are typically connected to one or more core networks.

Specifications for the Evolved Packet System (EPS) have been completed within the 3GPP and this work continues in the coming 3GPP releases. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access technology wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially “flat” architecture comprising radio network nodes connected directly to one or more core networks, i.e. they are not connected to RNCs.

Communication between entities, such as servers, applications, and network nodes, in a communication network may be performed through the use of Application Programming Interfaces (API). Examples of such APIs in a REpresentational State Transfer (REST) architecture are the RESTful Network APIs defined by the Open Mobile Alliance/Global System for Mobile Communications Association (OMA/GSMA).

APIs are specified in terms of abstract operations that can be invoked on a client or a server. RESTful Network APIs are based on the REST architecture, where clients and servers interact via requests and responses. The RESTful Network API operations generally act in an Hypertext Transfer Protocol (HTTP) system and thus employs HTTP protocol bindings, with HTTP-style verbs such as GET, POST, PUT, and DELETE. These verbs, which may also be referred to as commands, enable a user to change a resource, or to determine its current state.

In the context of a RESTful Network API, a resource may be described as an object of a particular type, having associated data and associated methods that operates on it, as well as having relationships to other resources. Resources may be grouped into collections, where each collection is homogeneous, i.e. only contains one type of resource. RESTful Network APIs may be used by applications of for example a web site acting on behalf of an consumer, or by other specialized applications such as notification services, and/or applications located on a UE.

Thus, there is a broad range of uses for APIs such as the RESTful Network APIs in the context of telecommunication networks. Currently, there is a demand from operators of telecommunication networks and communication service providers (CSP) to use RESTful Network APIs for making use of various capabilities of Internet Protocol Multimedia Subsystem (IMS) networks. It may for example be desirable to expose communication assets from the IMS core, such as from a Telephony Application Server (TAS) of the IMS network. In particular, it may be desirable to expose such assets by employing a OneAPI Call Control profile of the RESTful Network APIs, as defined by OMA/GSMA V4_0-20130305-C. Operators and CSPs are particularly interested in capabilities offered by a sub-API referred to as “CallNotification” outlined in the OMA publication *OMA-TS-REST_NetAPI_CallNotification-V*1_0-20190510-*D*, as it offers communication and/or call control extension possibilities.

For a RESTful Network API, such as the CallNotification, a specification is generally provided which defines:

- API resource definitions, together with an overall structure of multiple resources,
- a definition of HTTP operations for each resource, and
- a data type and enumeration type definition, including a description of operations to be performed, requests, responses and referenced faults.

The RESTful Network API data types and enumeration types are defined by specifying an “element”, a “type”, optionality (yes or no), and a description.

FIG. 1*a* illustrates such a specification for the CallNotification. The CallNotification may comprise the elements CallingParticipant, CallingParticipantName and CalledParticipant, and for each element there is an associated data type, see column two, an optionality and a description.

Call notification, and in particular, a resource call direction notification, allows an application, such as a 3rd party application to subscribe to a server for events related to an MultiMedia Telephony (MMTel) communication and/or call. Such a server may for example be a REST Application Server (REST AS). When such an event, which satisfies specified criteria, occurs, the server, for example, the REST AS, notifies the 3rd party application of said event. The 3rd party application will respond with a decision which action should be performed by the server.

Furthermore, capabilities offered by the CallNotification API and, in particular, the resource CallDirection notification, enable CSPs to provide exposure assets towards consumers, such as consumers of Mobile Virtual Network Operators (MVNO). Thereby, CSPs are able to control aspects of communication in a communication network that is relevant to them and, thus, extend and/or enhance their offering to consumers. CSPs may regard such abilities as a preliminary step towards 5G Service-Based Architecture (SBA) and Service based Interface (SBI), where protocol interfaces that are usually used in a telecommunications setting are to be replaced by web-based APIs.

In the current CallNotification specification the data structure associated with the data type a CallEventNotification is used to notify the application of a call direction event. As illustrated in FIG. 1*a*, the elements passed may include, e.g. callingParticipant, callingParticipantName, and calledParticipant. This information is not sufficiently rich for the consumer, e.g. the 3rd party application, to implement the desired services in a cost and latency efficient fashion. In addition, network and/or network signalling related information may also be requested by consumers. An example of the aforementioned is session initiation protocol (SIP) related data like Private-Access-Network-Info (PANI) and Private-Visited-Network-ID (PVNI).

In various applicable scenarios, an application, such as a 3rd party application, may request that a server performs a certain action. In the context of a RESTful API, the application would refer to a specific API of a data type action denoted as Action. The action may be specified by an element with an associated type, optionality and description, as shown in FIG. 1*b*. An application may thus request the action with its associated element "ActionToPerform". The values currently defined for the element ActionToPerform are values corresponding to: "Route", "Continue", "EndCall", and "Deferred". However, there is a need to return a more abundant action set.

SUMMARY

An object of embodiments herein is therefore to enable service providers to provide extended and/or enhanced services towards their consumers.

According to an aspect of embodiments herein, the object is achieved by a method performed by an IMS node for handling communication in a wireless communication network. The IMS node transmits, to a network node, data indicating a notification of a direction for a communication and information related to an additional service for the communication. The IMS node further receives, from the network node, an indication of an action related to the communication and/or data related to the additional service.

According to another aspect of embodiments herein, the object is achieved by a method performed by a network node for handling communication in a wireless communication network. The network node receives, from an IMS node, data indicating a notification of a direction for a communication and information related to an additional service for the communication. The network node further determines whether to transmit data related to the additional service to the IMS node based on the received information. In case the network node determines to transmit the data, the network node transmits, to the IMS node, an indication of an action related to the communication and/or the data related to the additional service. In case the network node determines not to transmit the data, the network node transmits, to the IMS node, an indication of an action related to the communication.

According to a further aspect of embodiments herein, the object is achieved by an IMS node for handling communication in a wireless communication network. The IMS node is configured to transmit, to a network node, data indicating a notification of a direction for a communication and information related to an additional service for the communication. The IMS node is further configured to receive, from the network node, an indication of an action related to the communication and/or data related to the additional service.

According to a yet further aspect of embodiments herein, the object is achieved by a network node for handling communication in a wireless communication network. The network node is configured to receive, from an IMS node, data indicating a notification of a direction for a communication and information related to an additional service for the communication. The network node is further configured to determine whether to transmit data related to the additional service to the IMS node based on the received information. In case having determined to transmit the data, the network node is configured to transmit, to the IMS node, an indication of an action related to the communication and/or the data related to the additional service. In case having determined not to transmit the data, the network node is configured to transmit to the IMS node, an indication of an action related to the communication.

The solution herein allows CSPs to provide additional services such as ability to play an announcement to the consumer, preferably a pre-prepared, pre-call announcement. Such an announcement may, for example, be used to convey a message to the consumers concerning rates, special offers or any additional features or services being provided, e.g., by a CSP through an MVNO. Thereby, CSPs may improve their services and monetarize their service offering in a cost and latency efficient manner, since invoking server APIs to achieve similar functionality would no longer be required.

Furthermore, through embodiments herein, the CSPs may provide enhanced services to an existing consumer base, such as MVNOs, at a beneficial cost, since HTTP-based RESTful APIs are less cumbersome to implement than, for example, diameter interfaces. CSPs may also expose assets to new consumers.

Yet another advantage of embodiments herein is that the additions may be designed to be backward compatible, so that they may be updated with additional information without impacting deployed network nodes.

Thus, embodiments herein enable service providers to provide extended and/or enhanced services towards their consumers.

BRIEF DESCRIPTION OF THE DRAWINGS

Examples of embodiments herein are described in more detail with reference to attached drawings in which:

FIGS. 1*a-b* are tables illustrating present specifications of RESTful APIs.

FIGS. 7*a-c* are tables depicting elements according to embodiments herein.

FIGS. 8*a-b* are tables depicting elements according to embodiments herein.

FIG. 10 is a schematic block diagram illustrating embodiments of an IMS node according to embodiments herein.

FIG. 11 is a schematic block diagram illustrating embodiments of a network node according to embodiments herein.

DETAILED DESCRIPTION

Figure 2:
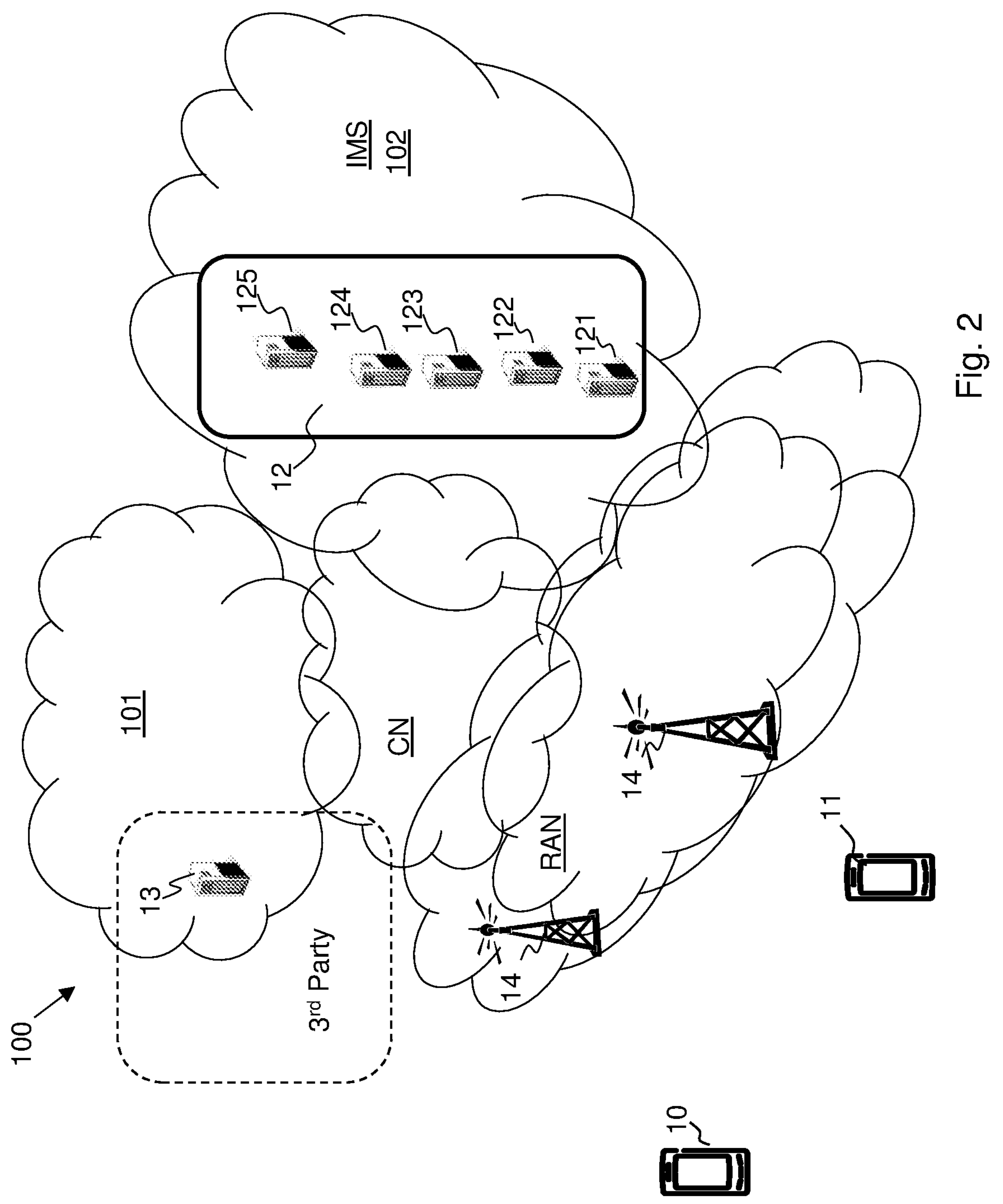
FIG. 2 is a schematic diagram illustrating a communications network according to embodiments herein.

FIG. 2 is a schematic overview depicting a communications network 100 wherein embodiments herein may be implemented. The communications network 100 comprises one or more RANs, one or more CNs and one or more IMS networks. The communications network 100 may use any technology such as 5G new radio (NR) but may further use a number of other different technologies, such as, Wi-Fi, long term evolution (LTE), LTE-Advanced, wideband code division multiple access (WCDMA), global system for mobile communications/enhanced data rate for GSM evolution (GSM/EDGE), worldwide interoperability for microwave access (WiMax), or ultra mobile broadband (UMB), just to mention a few possible implementations.

One or more network nodes 13 operate in the communications network 100. Such a network node 13 may be a cloud based server or an application server providing services and applications. The network node 13 may e.g. be represented by a REST Application node. The network node 13 may be located in a 3$^{rd}$ Party domain of the communications network 100 or in a cloud 101, as depicted in FIG. 2.

Nodes in an IMS network 102, such as an IMS node 12 also operate in the communications network 100. The IMS node 12 may comprise one or more of the following nodes: a first IMS node 121, a second IMS node 122, a third IMS node 123, a fourth IMS node 124, and a fifth IMS node 125. The first IMS node 121 may, for example, be a Call Session Control Function (CSCF). The second IMS node 122 may, for example, be a Telephony Application Server (TAS). The third IMS node 123 may, for example, be a REpresentational State Transfer Application Server (REST AS). The fourth IMS node 124 may, for example, be an MultiMedia Telephony Application Server (MMTel AS). The fifth IMS node 125 may, for example, be a Media Resource Function (MRF). The IMS nodes may be collocated in one network node or in separated network nodes. The IMS node 12 may in embodiments herein comprise a TAS comprising at least the third IMS node 123 and the fourth IMS node 124, or alternatively comprise the third IMS node 123 such as a REST AS. The IMS node 12 may be connected to one or more of the network nodes 13. Furthermore, the IMS node 12 and the network node 13 may be collocated nodes, stand-alone nodes or distributed nodes comprised fully or partly in the cloud 101.

The communications network 100 may further comprise one or more radio network nodes 14 providing radio coverage over a respective geographical area by means of antennas or similar. The geographical area may be referred to as a cell, a service area, beam or a group of beams. The radio network node 12 may be a transmission and reception point e.g. a radio access network node such as a base station, e.g. a radio base station such as a NodeB, an evolved Node B (eNB, eNode B), an NR Node B (gNB), a base transceiver station, a radio remote unit, an Access Point Base Station, a base station router, a transmission arrangement of a radio base station, a stand-alone access point, a Wireless Local Area Network (WLAN) access point, an Access Point Station (AP STA), an access controller, a UE acting as an access point or a peer in a Mobile device to Mobile device (D2D) communication, or any other network unit capable of communicating with a UE within the cell served by the radio network node 14 depending e.g. on the radio access technology and terminology used.

UEs such as a first UE 10 and a second UE 11 operate in the communications network 100. The first UE 10 and the second UE 11 may e.g. each be a mobile station, a non-access point (non-AP) STA, a STA, a user equipment (UE) and/or a wireless terminal, an NB-internet of things (IoT) mobile device, a Wi-Fi mobile device, an LTE mobile device and an NR mobile device communicate via one or more Access Networks (AN), e.g. RAN, to one or more core networks (CN). It should be understood by those skilled in the art that "UE" is a non-limiting term which means any terminal, wireless communication terminal, wireless mobile device, device to device (D2D) terminal, or node e.g. smart phone, laptop, mobile phone, sensor, relay, mobile tablets, television units or even a small base station communicating within a cell.

The methods according to some embodiments herein are performed by the IMS node 12, and the methods according to some other embodiments are performed by the network node 13.

Figure 3:
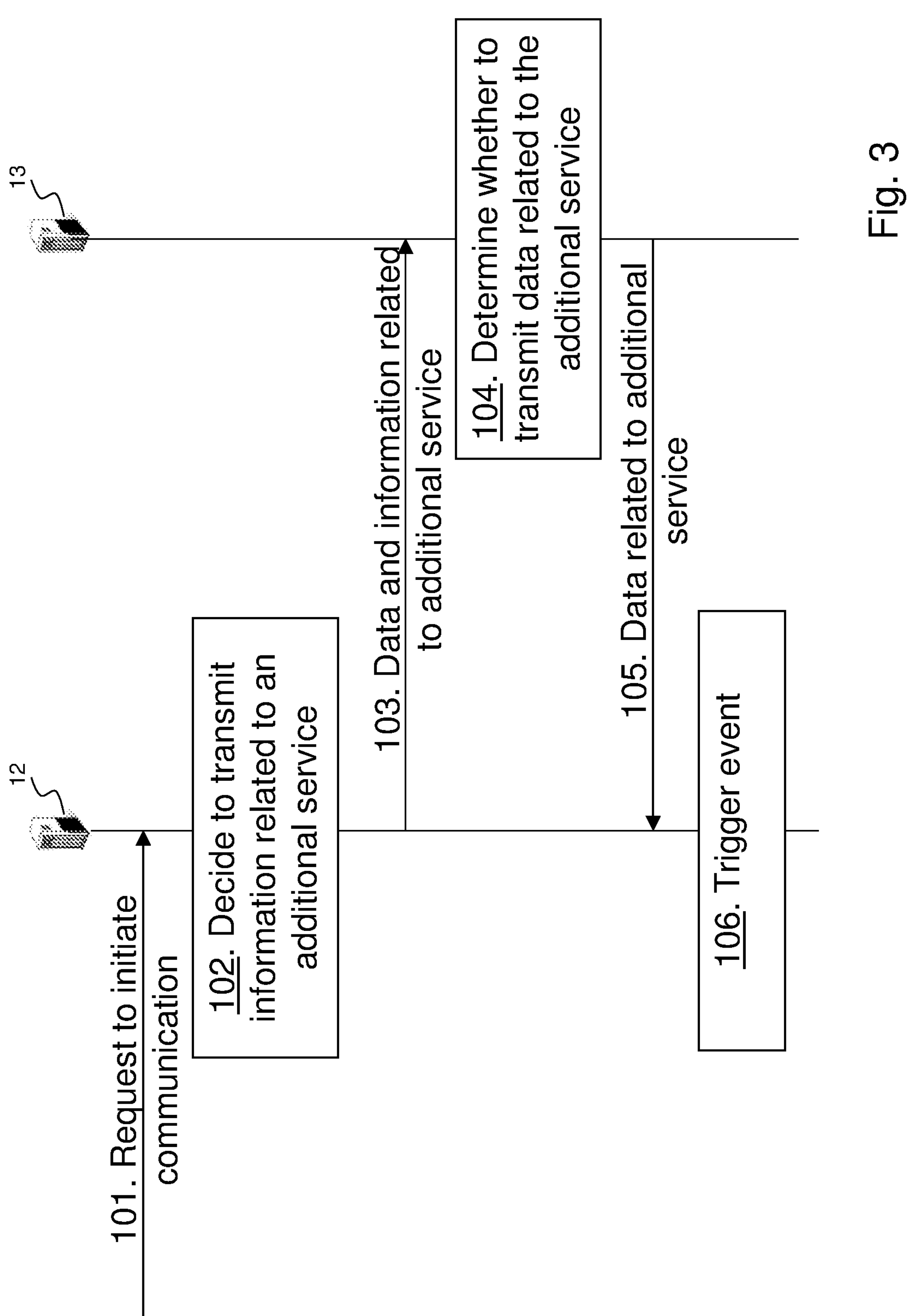
FIG. 3 is a combined signalling diagram and flowchart depicting embodiments of a method in the communications network according to embodiments herein.

An example scenario of embodiments herein is depicted in the combined signaling diagram and flowchart in FIG. 3.

Action 101. The IMS node 12 may receive a request, from the first UE 10, to initiate a communication, such as a call, to the second UE 11.

Action 102. The IMS node 12 may decide to transmit information related to an additional service for the communication to the network node 13. The additional service is related to the received communication request. The IMS node may base this decision on capability, subscription of the UEs or information related to the network node 13.

Action 103. The IMS node 12 may then transmit to the network node 13, data indicating a notification of a direction for a communication such as e.g. CallDirectionParticipants, and the information related to the additional service it may have decided to transmit.

Action 104. Upon receiving the transmission from the IMS node 12, the network node 13 may determine whether to transmit data related to the additional service to the IMS node 12, based on the received information. The network node 13 may further take internal data into account such as capability, subscription of the UEs or information related to the network node 13. The network node 13 may, e.g., take subscription data such as credit levels into account as well as the indication that the IMS node and/or participant supports the additional service.

Action 105. The network node 13, in case determining to transmit the data related to the additional service, transmit the data related to the additional service. The data may for example be comprised in an element in the type Action. In a scenario where a subscriber of the first UE 10 may have a low credit level, the network node 13 may transmit data enabling the IMS node 12 to play an announcement to the subscriber indicating that the credit is low. Similarly, the network node 13 may transmit data enabling the IMS node 12 to play a customized announcement to the subscriber of the first UE 10, such as weather forecast, traffic conditions or the like. The data may e.g. be in the form of an action indication such as an announcement indication.

Action 106. The IMS node 12, upon receiving the data, may then trigger one or more events related to the additional service. The IMS node 12 may, for example, trigger a media resource function (MRF), to add and/or modify media resources and play an announcement to the user of the first UE 10.

Embodiments herein aim to provide information that can be used by, for example, the CallDirection API consumers, enabling a richer deterministic framework for the consumers to provide enhanced service towards their consumers.

Furthermore, some embodiments herein aim to provide methods where information may be returned from the consumer and/or the application to the server, thereby enabling a more advanced ActionToPerform framework.

Figure 4:
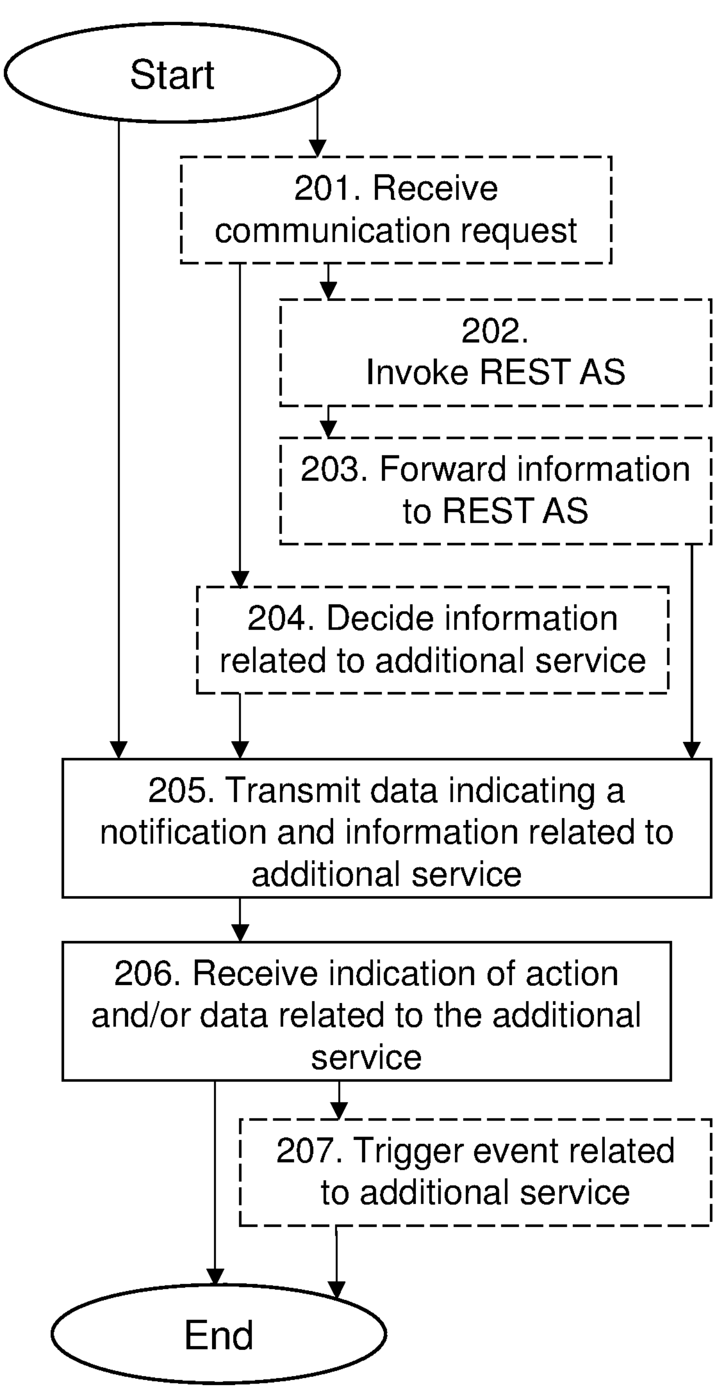
FIG. 4 is a flowchart depicting embodiments of a method in an IMS node according to embodiments herein

Example embodiments of a method performed by the IMS node 12 for handling communication in a wireless communication network will now be described with reference to a flowchart depicted in FIG. 4. The IMS node 12 may comprise one or more of the first IMS node 121, the second IMS node 122, the third IMS node 123, the fourth IMS node 124, and the fifth IMS node 125. In some embodiments herein, the IMS node 12 may be a distributed node. The IMS node may comprise a TAS and/or a REST AS. The method comprises the following actions, which actions may be taken in any suitable order. Actions that are optional are presented in dashed boxes in FIG. 4.

Action 201. In an example scenario herein, the IMS node 12 may receive a communication request from a first participant such as the first UE 10. The communication request may be received, prior to transmitting data indicating a notification and information related to an additional service. The communication request may, e.g., be received by or via the CSCF.

Action 202. The IMS node 12 may, upon having received the communication request in Action 201, invoke the REST AS. In some embodiments herein, the CSCF may invoke the REST AS, and in some embodiments herein, the TAS may invoke the REST AS. Invoking the REST AS may occur prior to transmitting data indicating a notification and information related to an additional service.

Action 203. The IMS node 12 may forward information to the REST AS. Such information may e.g. comprise the identity of the subscriber or the UE 10, such as a session initiation protocol (SIP) uniform resource identifier (URI) or a telephone (TEL) URI. The subscriber may, e.g., indicate that a service, such as a callDirection service, should be invoked. Additionally and/or alternatively, the REST AS may determine if an additional service should be invoked, independently or based on a received identity of the subscriber.

In some embodiments herein, the TAS may forward the information to the REST AS. Forwarding information to the REST AS may occur prior to transmitting data indicating a notification and information related to an additional service.

Action 204. The IMS node 12, in some embodiments herein, may decide 204 what information related to the additional service to transmit. For example, the REST AS is invoked by the CSCF with subscriber identity. The CSCF may figure this out based on profile data downloaded from home subscriber server (HSS). The REST AS may then figure out what additional service the subscriber is interested in invoking.

Action 205. The IMS node 12 transmits to the network node 13, data indicating the notification of a direction for a communication and the information related to an additional service for the communication. The information related to the additional service may be transmitted to the network node 13 as an information element of a CallNotification message.

Action 206. In response to the transmission in action 205 above, the IMS node 12 receives, from the network node 13, an indication of an action related to the communication and/or data related to the additional service. The indication of an action related to the communication may e.g. be an element of the type Action, such as the ActionToPerform element depicted in FIG. 1*b*. The ActionToPerform element may indicate an action such as Endcall, Continue, Route and Deferred. The data related to the additional service may be received by the IMS node 12 as an information element of an Action message. The data related to the additional service may be received when network node 13 determined to add the additional service the network node 13 by the IMS node 12. In an example scenario, if the additional service is adapted to play an announcement to a subscriber that has a credit below a certain threshold, data related to the additional service may be received by the IMS node 12 if the subscriber was found to have credit below the assigned threshold by for example the network node 13, thereby enabling the IMS node 12 to trigger such an announcement.

Action 207. After having received the data related to the additional service, the IMS node 12 may trigger 207 an event related to the additional service. The event may comprises a MRF, adding or modifying media resources, and playing at least one announcement to a first participant. The event may further comprise continuing communication to the first participant; and continuing communication to a second participant.

Figure 5:
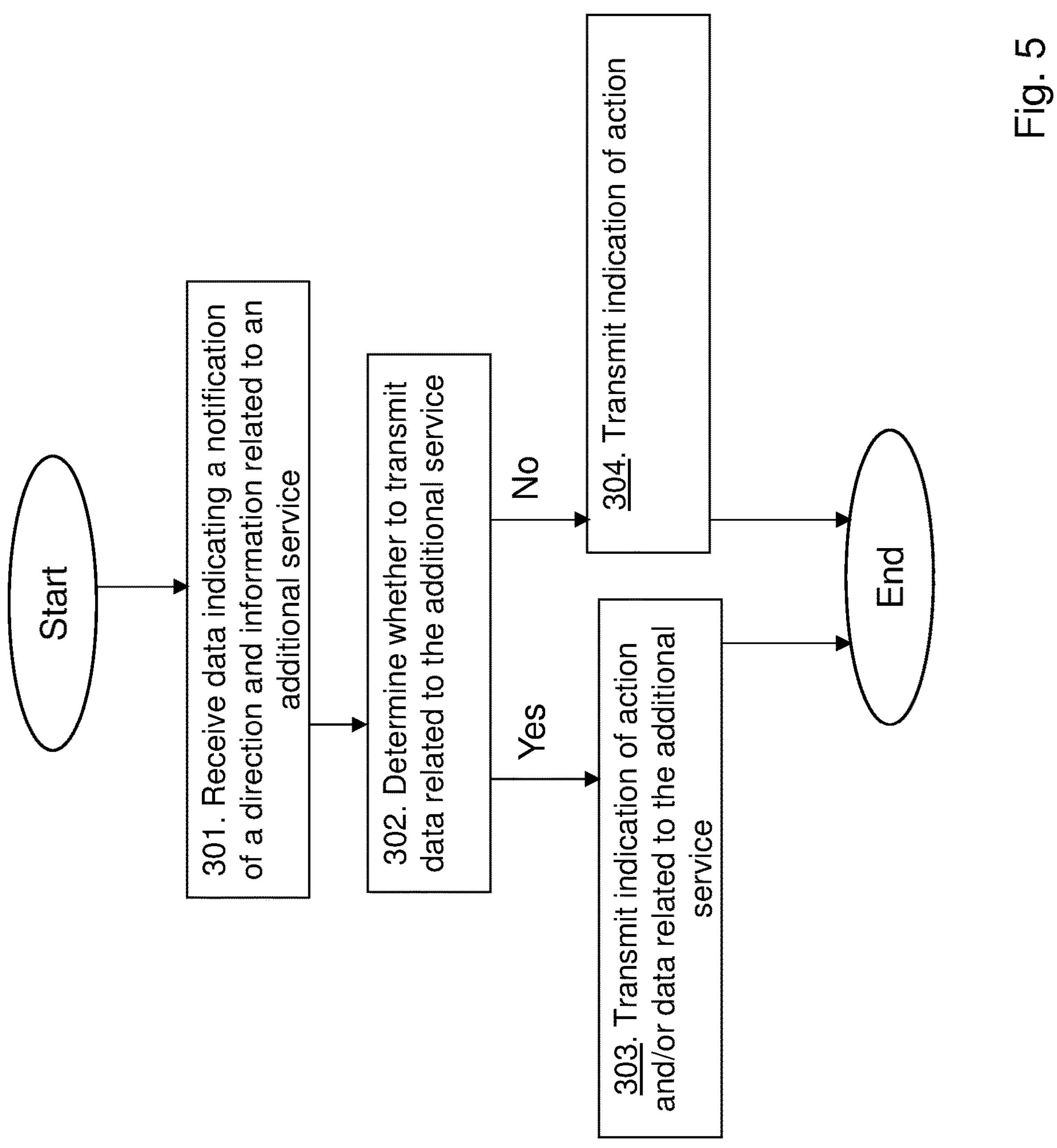
FIG. 5 is a flowchart depicting embodiments of a method in a network node according to embodiments herein.

An advantage of the method depicted in FIG. 5 is that information is provided that can be used by the CallDirection API consumers, which information enables a richer deterministic framework for consumers to provide extended and/or enhanced services towards their consumers.

Example embodiments of a method performed by the network node 13, for handling communication in a wireless communication network will now be described with reference to a flowchart depicted in FIG. 5. The network node 13 may comprise a REST application, and/or the IMS node 12 may comprise a TAS and/or a REST AS. The method comprises the following actions, which actions may be taken in any suitable order. Actions that are optional are presented in dashed boxes in FIG. 5.

Action 301. In an example scenario herein, the network node 13 receives, from the IMS node 12, data indicating a notification of a direction for a communication and information related to an additional service for the communication. The information related to the additional service may be received from the IMS node 12 as an information element of a CallNotification message.

Action 302. Having received data indicating a notification of a direction for a communication and information related to an additional service for the communication from the IMS node 12, the network node 13 determines whether to transmit data related to the additional service to the IMS node 12, based on the received information e.g. that additional services are supported.

Action 303. In case of the network node 13 determining to transmit the data, the network node 13 transmits, to the IMS node 12, an indication of an action related to the communication and/or the data related to the additional service. The data related to the additional service may be transmitted by the network node 13 as an information element of an Action message.

Action 304. In case of the network node 13 determining to transmit the data, the network node 13 transmits, to the IMS node 12, an indication of an action related to the communication.

Embodiments herein such as mentioned above will now be further described and exemplified. The text below is applicable to and may be combined with any suitable embodiment described above.

Figure 6B:
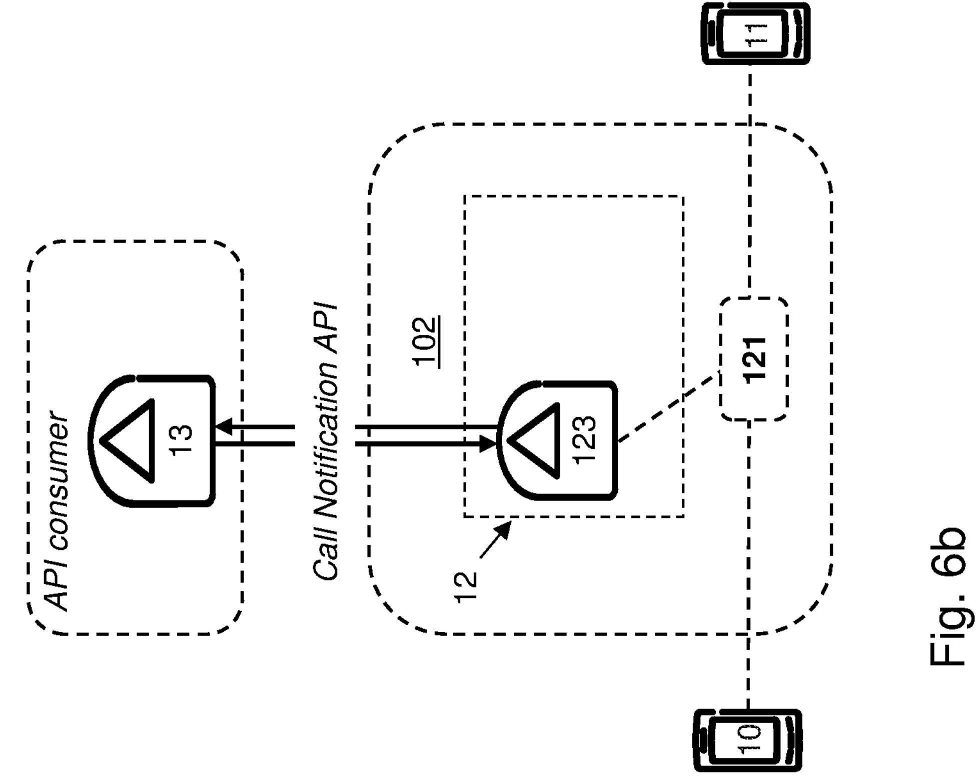
FIGS. 6*a-b* are schematic block diagrams depicting scenarios according to embodiments herein
Figure 6A:
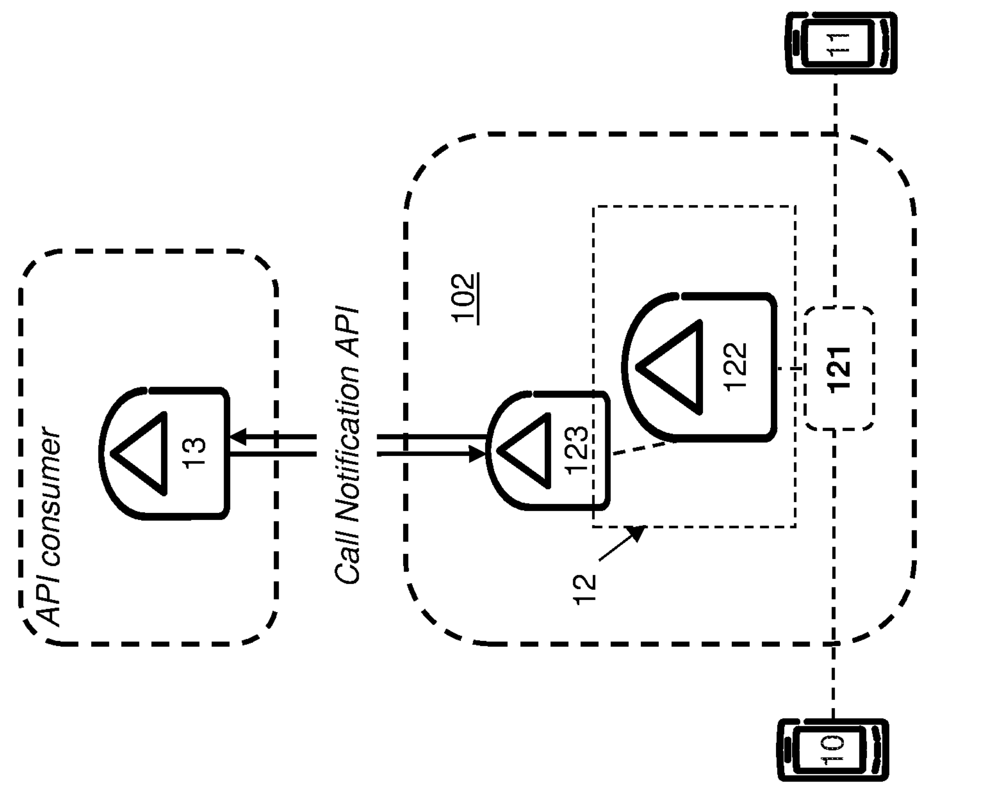

FIG. 6*a* depicts some architectural elements involved in embodiments herein.

The IMS network 102 may comprise the IMS node 12. The IMS node 12, in the example scenario, may comprise a TAS. The first IMS node 121 may be a CSCF and the third IMS node 123 may e.g. be a REST AS. The IMS node 12 may comprise the REST AS.

The network node 13, which may e.g. be a REST application, may be external from/of the IMS network and may consume communication and/or call assets from the IMS network 102, e.g. using an API, such as the OneAPI CallNotification API, as depicted in FIG. 6*a*. The network node 13 may communicate with one or more nodes in the IMS network 102, such as the IMS node 12.

In the example depicted in FIG. 6*a*, the network node 13 communicates with the IMS node 12, at the third network node 123 through the OneAPI CallNotification API.

Upon receiving an incoming call and/or a communication request for a subscriber with a service activated, such as a call direction service, the CSCF may forward the communication request to the IMS node 12.

Having received the communication request, the TAS may invoke the REST AS. In other words, the IMS node 12 may receive a communication request from a first participant. Thereafter, the IMS node 12 may invoke the third IMS node 123. The IMS node 12 may also forward relevant information to the REST AS. Optionally, the IMS node 12 may comprise the third IMS node 123, in which case the invocation and the forwarding of relevant information is performed internally in the IMS node 12.

The IMS node 12, at the third IMS node 123 in the example in FIG. 6*a*, may then decide what information related to the additional service to transmit to the network node 13. The IMS node 12 may e.g. decide what information to transmit based on profile information of the subscriber. The IMS node 12 may check the profile of the subscriber, based on the identity of the subscriber, e.g. the TEL/SIP URI, in order to obtain an indication of what services the profile is associated with. Such a service may e.g. be a direction service. The IMS node 12 may then invoke the network node 13 on behalf of the subscriber. In an example scenario, the REST AS may invoke a REST Application on behalf of a subscriber indicating that the subscribed subscribes to the additional service.

Having, optionally, decided at the REST AS what to transmit, the IMS node 12, e.g. at the REST AS as depicted in FIG. 6*a*, transmits data indicating the notification of the direction for the communication and information related to the additional service for the communication, to the network node 13. Based on the incoming call and/or the communication request and based on the network node 13 CallDirection event subscription information, the REST AS, may e.g. transmit a CallEventNotification: callDirection event to the network node 13. Such a notification may correspond to elements described in FIG. 1*a*, i.e., the notification may e.g. comprise CallingParticipant, CallingParticipantName and CalledParticipant.

The network node 13 may thus receive the data indicating the notification of the direction for the communication and information related to the additional service for the communication. The network node 13 may then determine whether to transmit data related to the additional service to the IMS node 12 based on the received information from the IMS node 12. In case the network node 13 determines to transmit the data, the network node 13 may transmit the indication of an action related to the communication and/or the data related to the additional service to the IMS node 12.

In case the network node 13 determines not to transmit the data, the network node 13 may transmit the indication of an action related to the communication to the IMS node 12, e.g. to the REST AS. The IMS node 12, thus receives an indication of an action related to the communication and/or data related to the additional service.

The network node 13 may return a CallDirection response to the IMS node 12, e.g. received at the third IMS node 123, as depicted in FIG. 6*a*, or at a second IMS node 122 comprising the third IMS node 123 (not shown). The CallDirection response returned from the network node 13 may e.g. be passed as an element in the type: Action. Such a response may correspond to elements described in FIG. 1*b*, i.e., the response may e.g. comprise ActionToPerform and RoutingAddress.

FIG. 6*b* depicts some architectural elements involved in embodiments herein.

The IMS node 12, in the example scenario, may at least comprise the third IMS node 123, i.e. the REST AS. The first IMS node 121 may be a CSCF. The IMS node 12 may also comprise other IMS nodes, such as the second IMS node 122 (not shown), the fourth IMS node 124 (not shown), and the fifth IMS node 125 (not shown). The second IMS node 122 may e.g. be a TAS, the fourth IMS node 124 may e.g. be an MMTel AS, and the fifth IMS node 125 may e.g. be a MRF.

The network node 13, comprising a REST application, may be external from/of the IMS network and may consume communication and/or call assets from the IMS network 102, e.g. using an API, such as the OneAPI CallNotification API, as depicted in FIG. 6*b*. The network node 13 may communicate with one or more nodes in the IMS network 102, such as the IMS node 12.

In the example depicted in FIG. 6*b*, the network node 13 communicates with the third network node 123 through the OneAPI CallNotification API.

Upon receiving an incoming call and/or a communication request for a subscriber with a service activated, such as a call direction service, the first IMS node 121, may invoke the third IMS node 123. In other words, the first IMS node 121 may receive a communication request from a first participant. Thereafter, the first IMS node 121 may invoke the REST AS.

The IMS node 12, at the third IMS node 123 in the example in FIG. 6*b*, may then decide what information related to the additional service to transmit.

Having, optionally, decided at REST AS what to transmit, the IMS node 12 transmits data indicating the notification of the direction for the communication and the information related to the additional service for the communication, to the network node 13. Based on the incoming call and/or the communication request and based on the network node 13 CallDirection event subscription information, the third IMS node 123, may e.g. transmit a CallEventNotification: callDirection event to the network node 13. Such a notification may correspond to the elements described in FIG. 1*a*, i.e., the notification may e.g. comprise CallingParticipant, CallingParticipantName and CalledParticipant.

The network node 13 may thus receive the data indicating the notification of the direction for the communication and the information related to the additional service for the communication. The network node 13 may then determine whether to transmit data related to the additional service to the IMS node 12 based on the received information from the IMS node 12.

In case the network node 13 determines to transmit the data, the network node 13 may transmit the indication of the action related to the communication and/or the data related to the additional service to the IMS node 12. In case the network node 13 determines not to transmit the data, the network node 13 may transmit the indication of the action related to the communication to the IMS node 12.

The IMS node 12, e.g. at the third network node 123, thus receives an indication of an action related to the communication and/or the data related to the additional service.

The network node 13 may e.g. return a CallDirection response to the IMS node 12, e.g. received at the third IMS node 123, as depicted in FIG. 6*b*. The CallDirection response returned from the network node 13 may e.g. be passed as an element in the type: Action. Such a response may correspond to the elements described in FIG. 1*b*, i.e., the response may e.g. comprise ActionToPerform and RoutingAddress.

FIGS. 7*a-c* depict features of embodiments herein.

Referring particularly, but not exclusively, to actions 101/201 and 102/202, an entity comprised in the IMS node 12, such as the first IMS node 121 or the second IMS node 122, may invoke the REST AS upon receiving an incoming call and/or communication request for a subscriber with a CallDirection service activated. The first IMS node 121 may e.g. be a CSCF, the second IMS node 122 may e.g. be a TAS, and the third IMS node 123 may e.g. be a REST AS. As described above, with reference to FIGS. 6*a-b*, the REST AS may send a CallEventNotification: callDirection event to the network node 13. The event be sent based on the incoming call and/or communication information and the network node 13 CallDirection event subscription information. In addition, the IMS node 12, e.g. through the REST AS, may include a newly added element populated. The newly added element may be referred to as “Additional-net-info”. The network node 13 may then avail of this newly introduced information and decide, based on the service it may offer, to return another newly introduced element, which may be referred to as “Announcement-info” in the callDirection response (announcement-type=Local). The REST AS in combination with the MMTel AS may then play a locally configured announcement towards the caller.

An example of the new element referred to as Additional-net-info is depicted in FIG. 7*a* and may, for example, be specified as follows:

Element: Additional-Net-info

Type: Additional-net-info-Types [0 . . . unbounded]

Optional: Yes

Description: Additional network information (e.g. SIP headers, SIP values etc)

Additional-net-info may be defined as optional and may contain network related information associated with the communication and/or call direction event notification. As depicted in FIG. 7*b*, it may be enumerated to comprise values such as Sip-information, e.g. comprising SIP header and SIP value elements, and Info 1 values, which may be predefined between producers, such as CSPs, and consumers, such as MVNOs. These may for example comprise values such as time stamp information and user agent information. These enumerated values may be added in a backward compatible fashion.

FIGS. 8*a-b* depict further features of embodiments herein.

As previously mentioned, an object of embodiments herein is to provide information returned from a consumer and/or from an application, such as a REST Application i.e. the network node 13, to a server, thereby enabling a more advanced framework for ActionToPerform. As described above with reference to FIGS. 7*a-c*, the information may be passed to the network node 13 being represented by a REST Application, as a new element in the type: CallNotification, which may be referred to as CallEventNotification.

The information returned from the network node 13 may be passed as a new element in the type: Action. The new element may, for example, be referred to as Announcement-info.

An example of the new element referred to as Announcement-info is depicted in FIG. 8*a* and may, for example, be specified as follows:

Element: Announcement-info

Type: Announcement-info-Types [0 . . . unbounded]

Optional: Yes

Description: Information on announcement to be played.

Announcement-info may be defined as optional and may comprise announcement information associated with the communication and/or call direction event notification. The announcement may for example be played to a calling participant (caller). As depicted in FIG. 8*b*, it may be enumerated to comprise values such as:

- announcement-type, which may be given as Local (a media resource local to the serving network), External (a media resource external to the serving network), or Audiocall (a future proof extension whereby the OneAPI AudioCall API may be invoked if for example prompt and collect capabilities are required);
- Announcement-address, which may be used for the address, e.g. URI, to be used in case announcement-type indicates “external”; and
- Announcement-code, which may for example be used by the media resource serving the request.

Figure 9A:
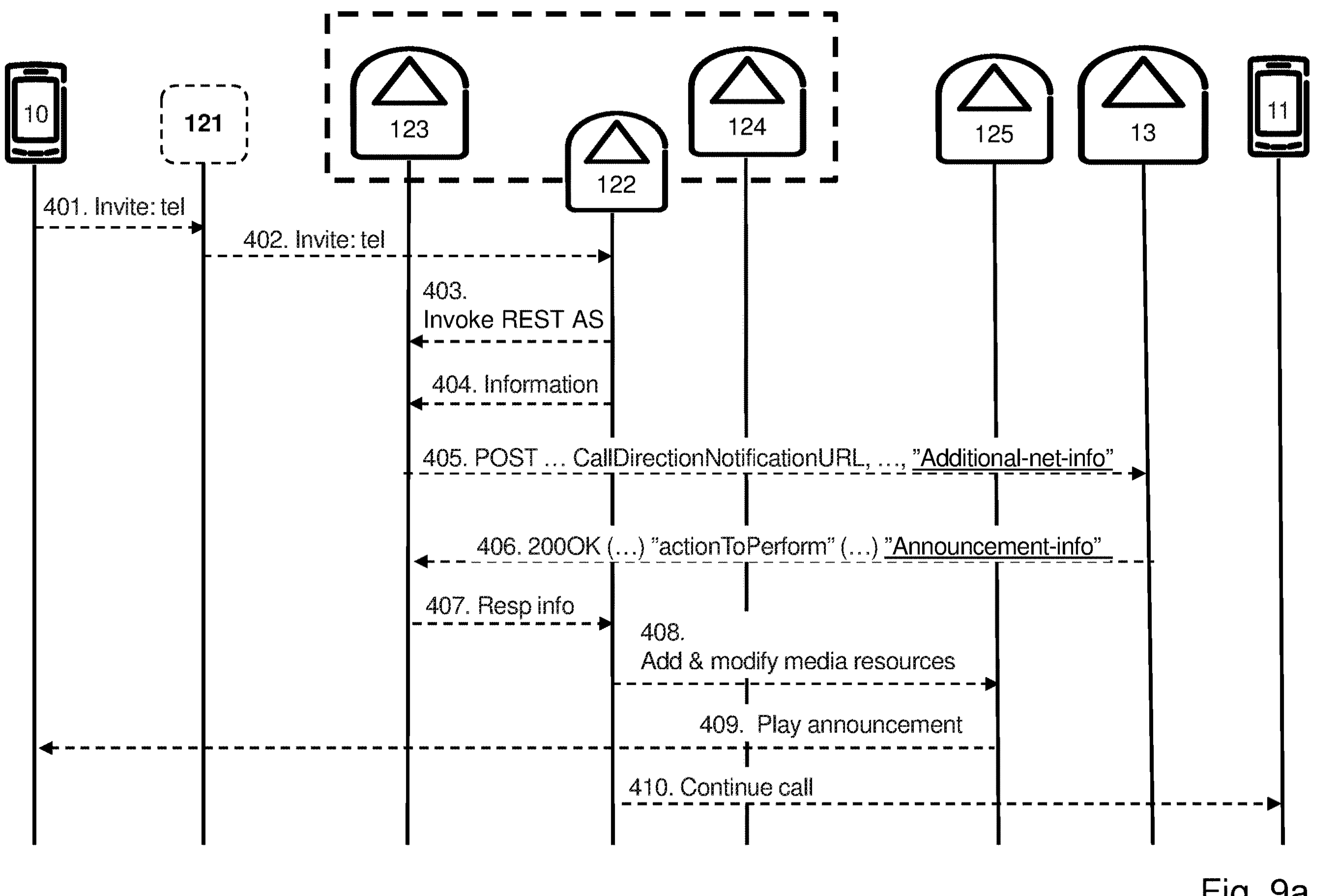
FIGS. 9*a-b* are signalling schemes according to embodiments herein.

An example scenario of embodiments herein is depicted in the signaling diagram in FIG. 9*a*. In the example scenario, for legibility, some signalling is omitted. The IMS node 12 may comprise a first, a second, a third, a fourth and a fifth IMS node 121-125. The first IMS node 121 may be a CSCF, the second IMS node 122 may be a TAS, the third IMS node 123 may be a REST AS, the fourth IMS node may be an MMTel AS and the fifth IMS node 125 may be MRF. In this example the IMS node 12 comprises the TAS, the REST AS and the MMTel AS.

A communication session may be initiated from the first UE 10 towards the second UE 11 and an invite may be sent (401) to the IMS core. The IMS core may, e.g. be represented by the first IMS node 121 as depicted in FIG. 9*a*.

The IMS core, e.g. represented by CSCF, may then trigger (402), and forward the Invite towards, the second IMS node 122. Thereby, call direction service may be activated for calling subscriber and the second IMS node may invoke (403) the third IMS node 123, and relevant information may be forwarded (404).

Based on the events the network node 13 has subscribed to, the third IMS node 123 may transmit (405) a POST "CallDirectionNotification" message to the network node 13. The message may comprise the newly introduced element "additional-net-info" and the enumeration "additional-info-type" with the values "SIP-info" consisting of the populated values "header=accessNetworkInfo" and value containing the value of the PANI received in the SIP signaling. Further information may also be populated, such as a "time-stamp" value of the received Invite.

The network node 13 may then avail of the newly introduced information and decide to invoke a service (based on the accessNetworkInfo of the subscriber associated with the first UE 10) which entails that a pre-call announcement may be played to the subscriber associated with the first UE 10. In such a scenario, the network node 13 may determine to transmit the data related to the additional service to the IMS node 12. To this end, the network node 13 may return (406) a 2000K to the third IMS node 123 with ActionToPerform as continue and, additionally, with the newly introduced element announcement-info, the enumeration "announcement-info-type" with the values "announcement-type" consisting of the "local" (indicated that an announcement is played from the serving/local network) and "announcement-code" set to a value know by the MRF.

The third IMS node 123 may assemble the response information and return (407) it to the second IMS node 122.

The second IMS node 122 may then trigger (408) the fifth IMS node 125 to add and/or modify media resources, based on information sent from the second IMS node 122 to the fifth IMS node 125.

The fifth IMS node may then play (409) the required announcement to the user associated with the first UE 10. After the announcement, the call may continue, as triggered by the second IMS node 122.

The second IMS node 122 may also trigger (410) a continuation of the communication session to the second UE 11.

Figure 9B:
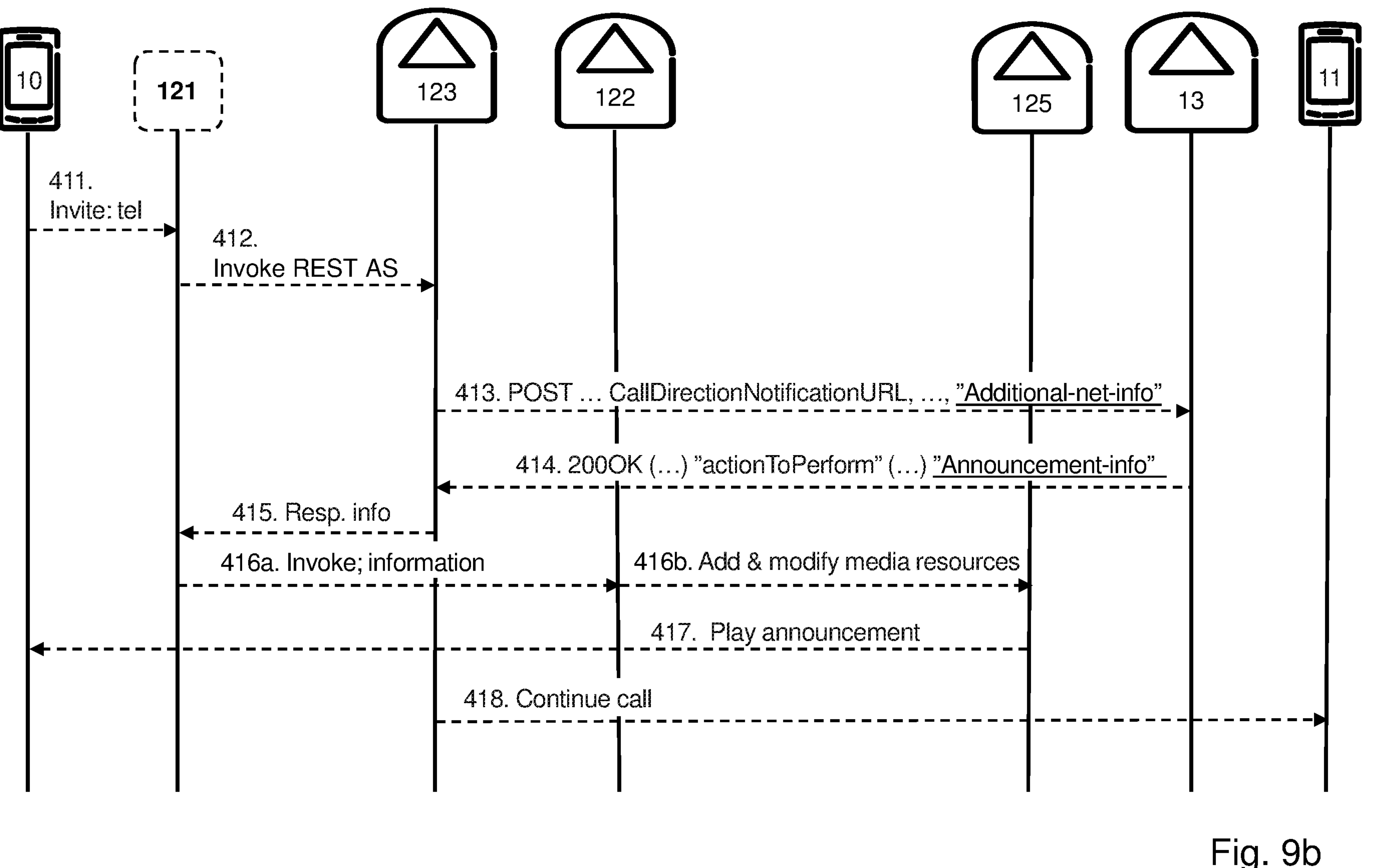

Another example scenario of embodiments herein is depicted in the signaling diagram in FIG. 9*b*. In the example scenario, for legibility, some signaling is omitted. In the example scenario depicted in FIG. 9*b*, and described below, the IMS node 12 may comprise a first, a second, a third, a fourth and a fifth IMS node 121-125. The first IMS node 121 may be a CSCF, the second IMS node 122 may be a TAS, the third IMS node 123 may be a REST AS, the fourth IMS node may be an MMTel AS and the fifth IMS node 125 may be MRF.

As described concerning FIG. 9*a*, a communication session may be initiated from the first UE 10 towards the second UE 11 and an invite may be sent (411) to the IMS core. The IMS core may, e.g. be represented by the first IMS node 121 as depicted in both FIGS. 9*a-b*.

However, where in the scenario depicted in FIG. 9*a*, the first IMS node 121 may trigger and forward the Invite towards the second IMS node 122, in the example depicted in FIG. 9*b*, the first IMS node 121 may instead invoke (412) the third IMS node 123 with information such as subscriber identity to the third IMS node 132 relating to the communication. Allowing the invocation in action 403 to be performed from the first IMS node 121 to the third IMS node 123, such as from the CSCF to the REST AS, provides flexibility of the manner in which the function may be deployed. This flexibility may e.g. lead to the added benefit that an operator may choose a preferential deployment, depending on the service at hand. Based on the events the network node 13 has subscribed to, the third IMS node 123 may transmit (413) a POST "CallDirectionNotification" message to the network node 13 i.e. the data indicating the notification of the direction for the communication. The message may comprise the newly introduced element "additional-net-info" and the enumeration "additional-info-type" with the values "SIP-info" consisting of the populated values "header=accessNetworkInfo" and value containing the value of the PANI received in the SIP signaling. Further information may also be populated, such as a "time-stamp" value of the received Invite. Thus, the information related to the additional service for the communication. The network node 13 may then avail of the newly introduced information and decide to invoke a service (based on the accessNetworkInfo of the subscriber associated with the first UE 10) which entails that a pre-call announcement may be played to the subscriber associated with the first UE 10. In such a scenario, the network node 13 may determine to transmit the data related to the additional service to the IMS node 12. To this end, the network node 13 may return (414) a 2000K to the third IMS node 123 with ActionToPerform as continue and, additionally, with the newly introduced element announcement-info, the enumeration "announcement-info-type" with the values "announcement-type" consisting of the "local" (indicated that an announcement is played from the serving/local network) and "announcement-code" set to a value know by the MRF, i.e. data related to the additional service.

The third IMS node 123 may assemble the response information and send it to the first IMS node 121 (415), in response to the invocation described above. The first IMS node 121 may then invoke, and send information to, (416*a*) the second IMS node 122.

The second IMS node 122 may then trigger (416*b*) the fifth IMS node 125 to add and/or modify media resources, based on information sent from the second IMS node 122 to the fifth IMS node 125.

The fifth IMS node may then play (417) the required announcement to the user associated with the first UE 10. After the announcement, the call may continue, as triggered by the second IMS node 122.

The second IMS node 122 may also trigger (418) a continuation of the communication session to the second UE 11.

To perform the method actions mentioned above for handling communication in a wireless communication network, the IMS node 12, depicted in two embodiments in FIG. 10, may comprise an arrangement.

The IMS node 12 may comprise a communication interface 1000 depicted in FIG. 10, configured to communicate e.g. with the communications network 100 also referred to as a cloud network. The communication interface 1000 may comprise a wireless receiver (not shown) and a wireless transmitter (not shown) and e.g. one or more antennas. The embodiments herein may be implemented through a processing circuitry 1001 configured to perform the methods herein. The processing circuitry may comprise one or more processors. Thus, it is herein provided the IMS node 12 e.g. comprising processing circuitry and memory, said memory comprising instructions executable by said processing circuitry whereby said IMS node 12 is operative to perform the methods herein.

The IMS node 12 may be configured to be a distributed node which may further be configured to comprise one or more of the first IMS node 121, the second IMS node 122, the third IMS node 123, the fourth IMS node 124 and the fifth IMS node 125. The first IMS node 121 may be a CSCF. The second IMS node 122 may be a TAS, and the third IMS node 123 may be a REST AS, and the fifth IMS node 125 may be an MRF.

The IMS node 12 may comprise a receiving unit 1002, e.g. a receiver or a transceiver with one or more antennas. The processing circuitry 1001, the IMS node 12 and/or the receiving unit 1002 is configured to receive, from the network node 13, the indication of the action related to the communication and/or the data related to the additional service. The data related to the additional service may be received by the IMS node 12 as an information element of an Action message. The processing circuitry 1001, the IMS node 12 and/or the receiving unit 1002 may further be configured to receive the communication request from the first participant, e.g. associated with the first UE 10.

The IMS node 12 may comprise an invoking unit 1003. The processing circuitry 1001, the IMS node 12 and/or the invoking unit 1003 may be configured to invoke the REST AS.

The IMS node 12 may also comprise a forwarding unit 1004. The processing circuitry 1001, the IMS node 12 and/or the forwarding unit 1004 may be configured to forward information to the REST AS. The information may e.g. comprise the identity of the subscriber, such as the SIP URI or TEL URI.

The IMS node 12 may comprise a deciding unit 1005. The processing circuitry 1001, the IMS node 12 and/or the deciding unit 1005 may be configured to decide, at the REST AS, what information related to the additional service to transmit.

The IMS node 12 may further comprise a transmitting unit 1006, e.g. a transmitter or a transceiver. The processing circuitry 1001, the IMS node 12 and/or the transmitting unit 1006 is configured to transmit, to the network node 13, data indicating the notification of the direction for the communication and information related to the additional service for the communication. The information related to the additional service may be transmitted to the network node 13 as an information element of a CallNotification message.

The IMS node 12 further comprises a triggering unit 1007. The processing circuitry 1001, the IMS node 12 and/or the triggering unit 1007 may be configured to, after having received the data related to the additional service, trigger an event related to the additional service. The event may comprise to, at the MRF, add and/or modify media resources, and play at least one announcement to a first participant. The event may further comprise the TAS to continue communication to the first participant, and continue communication to the second participant.

The embodiments herein may be implemented through a respective processor or one or more processors, such as a processor of the processing circuitry 1001 in the IMS node 12 depicted in FIG. 10, together with a respective computer program code for performing the functions and actions of the embodiments herein. The program code mentioned above may also be provided as a computer program product, for instance in the form of a data carrier carrying computer program code for performing the embodiments herein when being loaded into the IMS node 12. One such carrier may be in the form of a universal serial bus (USB) stick, a disc or similar. It is however feasible with other data carriers such as any memory stick. The computer program code may furthermore be provided as pure program code on a server and downloaded to the IMS node 12.

The IMS node 12 may further comprise a memory 1007 comprising one or more memory units to store data on. The memory comprises instructions executable by the processor. The memory 1007 is arranged to be used to store e.g. additional service information, data, other data, instructions, configurations and applications to perform the methods herein when being executed in the IMS node 12.

Those skilled in the art will also appreciate that the units in the IMS node 12 mentioned above may refer to a combination of analogue and digital circuits, and/or one or more processors configured with software and/or firmware, e.g. stored in the IMS node 12, that when executed by the respective one or more processors perform the methods described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

In some embodiments, a computer program 1008 comprises instructions, which when executed by the respective at least one processor, cause the at least one processor of the IMS node 12 to perform the actions above.

In some embodiments, a carrier 1009 comprises the computer program 1008, wherein the carrier 1009 is one of an electronic signal, an optical signal, an electromagnetic signal, a magnetic signal, an electric signal, a radio signal, a microwave signal, or a computer-readable storage medium.

To perform the method actions mentioned above for handling communication in a wireless communication network, the network node 13, depicted in two embodiments in FIG. 11, may comprise an arrangement.

The network node 13 may comprise a communication interface 1100 depicted in FIG. 11, configured to communicate e.g. with the communications network 100 also referred to as a cloud network. The communication interface 1100 may comprise a wireless receiver (not shown) and a wireless transmitter (not shown) and e.g. one or more antennas. The embodiments herein may be implemented through a processing circuitry 1101 configured to perform the methods herein. The processing circuitry may comprise one or more processors. Thus, it is herein provided the network node 13 e.g. comprising processing circuitry and memory, said memory comprising instructions executable by said processing circuitry whereby said network node 13 is operative to perform the methods herein.

The network node 13 may comprise a REST application; and/or the IMS node 12 may comprise a TAS, and/or a REST AS.

The network node 13 may comprise a receiving unit 1102, e.g. a receiver or a transceiver. The processing circuitry 1101, the network node 13 and/or the receiving unit 1102 is configured to receive, from the IMS node 12, the data indicating the notification of the direction for the communication and the information related to the additional service for the communication. The information related to the additional service may be received from the IMS node 12 as an information element of a CallNotification message.

The network node 13 may further comprise a determining unit 1103. The processing circuitry 1101, the network node 13 and/or the determining unit 1103 is configured to determine whether to transmit data related to the additional service to the IMS node 12, based on the received information.

The network node 13 may further comprise a transmitting unit 1104, e.g. a transmitter or a transceiver. The processing circuitry 1101, the network node 13 and/or the transmitting unit 1104 is configured to, in case having determined to transmit the data, transmit, to the IMS node 12, the indication of the action related to the communication and/or the data related to the additional service. In case of having determined not to transmit the data, the network node 13 is configured to transmit, to the IMS node 12, the indication of the action related to the communication. The data related to the additional service may be transmitted by the network node 13 as an information element of an Action message.

The embodiments herein may be implemented through a respective processor or one or more processors, such as a processor of the processing circuitry 1101 in the network node 13 depicted in FIG. 11, together with a respective computer program code for performing the functions and actions of the embodiments herein. The program code mentioned above may also be provided as a computer program product, for instance in the form of a data carrier carrying computer program code for performing the embodiments herein when being loaded into the network node 13. One such carrier may be in the form of a universal serial bus (USB) stick, a disc or similar. It is however feasible with other data carriers such as any memory stick. The computer program code may furthermore be provided as pure program code on a server and downloaded to the network node 13.

The network node 13 may further comprise a memory 1105 comprising one or more memory units to store data on. The memory comprises instructions executable by the processor. The memory 1105 is arranged to be used to store e.g. additional service information and data, subscription data, indications, instructions, configurations and applications to perform the methods herein when being executed in the network node 13.

Those skilled in the art will also appreciate that the units in the network node 13 mentioned above may refer to a combination of analogue and digital circuits, and/or one or more processors configured with software and/or firmware, e.g. stored in the network node 13, that when executed by the respective one or more processors perform the methods described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

In some embodiments, a computer program 1106 comprises instructions, which when executed by the respective at least one processor, cause the at least one processor of the network node 13 to perform the actions above.

In some embodiments, a carrier 1107 comprises the computer program 1106, wherein the carrier 1107 is one of an electronic signal, an optical signal, an electromagnetic signal, a magnetic signal, an electric signal, a radio signal, a microwave signal, or a computer-readable storage medium.

When using the word "comprise" or "comprising" it shall be interpreted as non-limiting, i.e. meaning "consist at least of".

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by an Internet Protocol (IP) Multimedia Subsystem (IMS) node for handling communication in a wireless communication network, the method comprising:

transmitting to a network node data indicating a notification of a direction for a communication and information related to an additional service for the communication;

receiving, from the network node, an indication of an action related to the communication and/or data related to the additional service; and after having received the data related to the additional service, triggering an event related to the additional service.

2. The method of claim 1, wherein the event comprises: to add or modify media resources to a media resource function (MRF); play announcement and continue communication to a first participant; and/or continue communication from a first participant to a second participant.

3. The method of claim 1, wherein the IMS node comprises a Telephony Application Server (TAS) and the network node comprises a representational state transfer application.

4. A method performed by a network node for handling communication in a wireless communication network, the method comprising:

receiving from an Internet Protocol (IP) Multimedia Subsystem (IMS) node, data indicating a notification of a direction for a communication and information related to an additional service for the communication;

determining whether to transmit data related to the additional service to the IMS node based on the received information; and in case determining to transmit the data, transmitting to the IMS node, an indication of an action related to the communication and/or the data related to the additional service, and in case determining not to transmit the data, transmitting to the IMS node, an indication of an action related to the communication.

5. The method of claim 4, wherein the network node comprises a representational state transfer (REST) application; and/or the IMS node comprises a Telephony Application Server (TAS), and/or a representational state transfer application server (REST AS).

6. The method of claim 4, wherein the information related to the additional service is received from the IMS node as an information element of a CallNotification message.

7. An IP Multimedia Subsystem (IMS) node for handling communication in a wireless communication network, the IMS node comprising:

a memory; and processing circuitry coupled to the memory, wherein the IMS node is configured to:

transmit to a network node, data indicating a notification of a direction for a communication and information related to an additional service for the communication;

receive from the network node, an indication of an action related to the communication and/or data related to the additional service; and after having received the data related to the additional service, trigger an event related to the additional service.

8. The IMS node of claim 7, wherein the event comprises:

to add or modify media resources to a media resource function;

play announcement and continue communication to a first participant; and/or continue communication from a first participant to a second participant.

9. The IMS node of claim 7, wherein the IMS node comprises a Telephony Application Server, and the network node comprises a representational state transfer application.

10. The IMS node of claim 9, wherein the IMS node is configured to, prior to transmitting the data indicating the notification and the information related to the additional service, receive a communication request from a first participant;

invoke a representational state transfer application server (REST AS); and forward information relating to the communication request to the REST AS.

11. The IMS node of claim 7, wherein the IMS node comprises a representational state transfer (REST) application server (AS), and the network node comprises a REST application.

12. The IMS node of claim 11, wherein the IMS node is configured to, prior to transmitting the data indicating the notification and the information related to the additional service, receive a communication request from a first participant; and decide what information related to the additional service to transmit.

13. The IMS node of claim 7, wherein the information related to the additional service is comprised in an information element of a CallNotification message.

14. The IMS node of claim 7, wherein the data related to the additional service is comprised in an information element of an Action message.

15. A network node for handling communication in a wireless communication network, the network node comprising:

a memory; and processing circuitry coupled to the memory, wherein the network node is configured to:

receive, from an IP Multimedia Subsystem (IMS) node, data indicating a notification of a direction for a communication and information related to an additional service for the communication;

determine whether to transmit data related to the additional service to the IMS node based on the received information; and in case having determined to transmit the data, transmit to the IMS node an indication of an action related to the communication and/or the data related to the additional service, and in case having determined not to transmit the data, transmit to the IMS node, an indication of an action related to the communication.

16. The network node of claim 15, wherein the network node is configured to comprise a representational state transfer (REST) application; and/or the IMS node is configured to comprise a Telephony Application Server and/or a representational state transfer application server.

17. The network node of claim 15, wherein the information related to the additional service is adapted to be received from the IMS node as an information element of a CallNotification message.

18. The network node of claim 15, wherein the data related to the additional service is adapted to be transmitted by the network node as an information element of an Action message.

* * * * *